A. PEARCE.
SUNSHADE FOR AUTOMOBILE WINDSHIELDS.
APPLICATION FILED JULY 15, 1920.

1,384,275.

Patented July 12, 1921.

Inventor
Austin Pearce
By his Attorneys
Pennie, Davis, Marvin & Edmonds

UNITED STATES PATENT OFFICE.

AUSTIN PEARCE, OF MEMPHIS, TENNESSEE.

SUNSHADE FOR AUTOMOBILE-WINDSHIELDS.

1,384,275.  Specification of Letters Patent.  Patented July 12, 1921.

Application filed July 15, 1920. Serial No. 396,388.

*To all whom it may concern:*

Be it known that I, AUSTIN PEARCE, a citizen of the United States, residing at Memphis, in the county of Shelby, State of Tennessee, have invented certain new and useful Improvements in Sunshades for Automobile-Windshields; and I do hereby declare the following to be a full, clear, and exact description of the invention, such as will enable others skilled in the art to which it appertains to make and use the same.

This invention relates to improvements in sun shade attachments for automobile wind shields, and has for its object to provide a sun shade or awning adapted to be readily attached to the wind shield of an automobile in such manner that the wind shield will shade the eyes of the driver of the car when driving toward the sun or where the light is such that the reflection from the glass wind shield interferes with proper vision.

A further object of the invention is to provide a device of this kind which is of low manufacturing cost, which is adaptable to various sizes and styles of wind shield, and which, when not in use, folds into a small space such that it may be readily carried under the seat of the car or elsewhere in the vehicle.

A further object of the invention is to provide a device of this character which may be variously positioned on the wind shield to secure different adjustments of the sun shade as may be desirable under different conditions.

The standard wind shield of an automobile consists of two glass panes supported one above the other in a frame extending from the dash board to the top of the vehicle, the two portions of the wind shield being separately pivoted for adjustment about a transverse axis. When the wind shield is opened the upper half is tilted out in a horizontal or inclined position with its forward edge extending well in front of the top of the car. As the wind shield is of glass it not only does not itself shade the driver, but adds to the glare by reflecting the light from the road into the car. By covering up the wind shield in whole or in part, the wind shield serves as an extension of the top after the manner of the vizor of a cap, and by adjusting the wind shield to the proper angle the driver and occupant of the front seat of the car may be entirely protected from the glare.

In the accompanying drawings I have illustrated a preferred form of my improved sun shade as adapted for any car of standard design.

Figure 1:
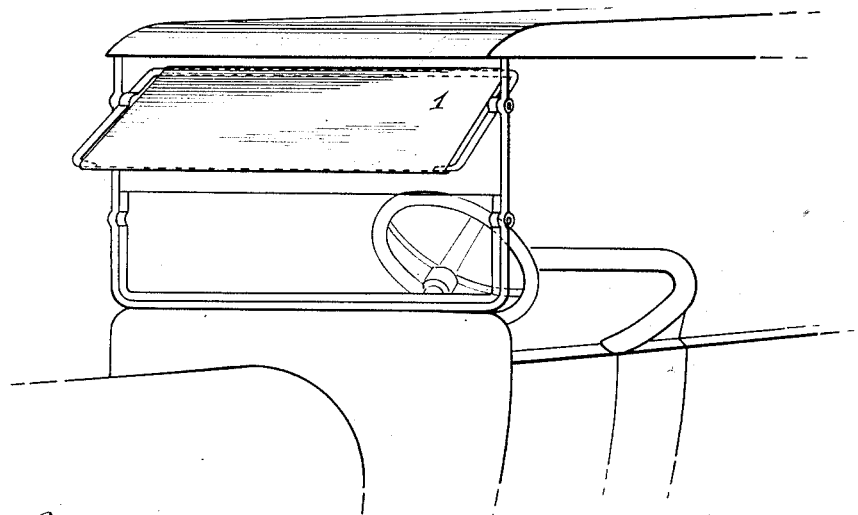
Figure 1 is a perspective view of a portion of an automobile showing my improved sun shade in use.
Figure 2:
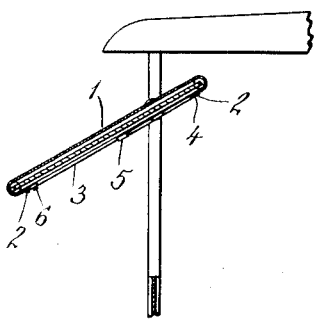
Figs. 2 and 3 are vertical sectional views through the wind shield showing the sun shade in different positions of adjustment.

Referring to the drawings, my sun shade consists primarily of a sheet 1 of awning cloth or other suitable fabric of a length about equal to the width of the wind shield to be covered and a width slightly greater than the height of the upper half of the wind shield so that the two edges of the fabric will fold over the edges of the wind shield in the manner shown in the drawings.

Figure 4:
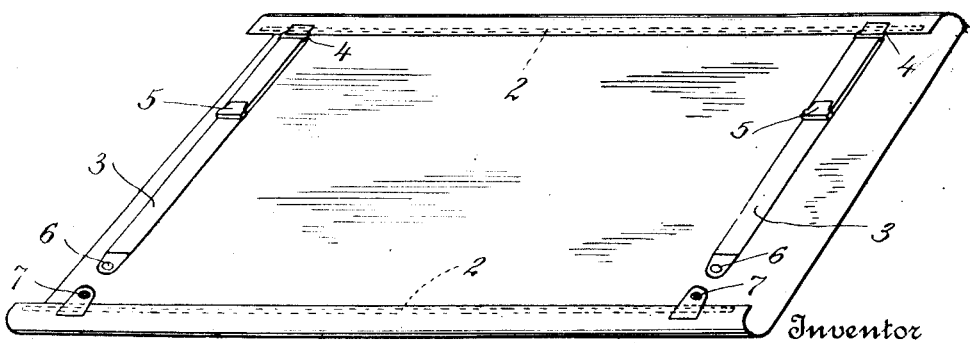
Fig. 4 is a perspective view of the sun shade detached from the wind shield and spread out to show the construction.

Each edge of the sun shade has attached to it, for instance by inclosure in a hem, a metal rod 2, shown in dotted lines in Fig. 4, extending substantially the length of the fabric. The fabric is provided near each end with attaching bands or straps 3, preferably of elastic or coiled springs, the bands being connected to one longitudinal edge of the fabric near each end thereof. Preferably each band is attached to the shade by means of metal loops 4 sewed to the edge of the fabric with the elastic strap run through the loop, or coiled springs with clamps may be substituted. The end of the strap is provided with a clasp or buckle 5 through which the other end of the strap is run after passing through the loop 4, so that the length of the strap may be adjusted as desired.

The free end of the strap 3 is provided with a snap fastener 6 such as is customarily employed for automobile curtains, the other part of the fastener being attached to a tab 7 attached to the other edge of the shade in the manner shown.

Figure 3:
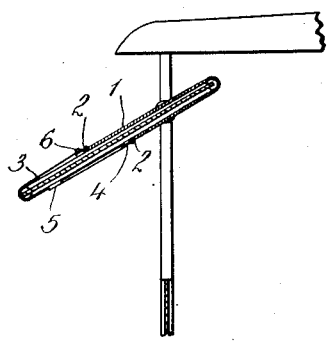

The sun shade is preferably applied to the upper half of the wind shield with the fabric to the front and the straps extending across the face of the wind shield adjusted so as to hold the sun shade taut against the glass. The sun shade will usually be applied to cover the entire glass and the desired shading effect secured by adjusting the wind shield to a more or less horizontal position. If, however, it is not desired to open the wind shield as far as would be necessary to have sufficient vision for driving with the glass completely covered, the sun shade may be adjusted in the manner shown in Fig. 3. That is, the fabric may cover only the upper portion of the wind shield with the straps extending around the lower edge of the glass so as to leave the lower portion of the glass exposed.

I have described the fastener employed as a curtain snap fastener, but of course any other style of fastener may be employed, such as a simple hook and ring. Also, instead of the elastic strap described, a simple leather or webbing strap may be employed with the strap end attached to one edge of the fabric and the buckle to the other. Other changes may also obviously be made.

In the appended claims I have used the expression "of single ply throughout" not as a limitation of the particular weave or character of the fabric, but to distinguish from the shields of the prior art wherein the fabric is folded back on itself and fastened to provide a pocket for one edge of the windshield. The applicant's shield is simply a strip of cloth such as duck or khaki, or it may of course be formed of other fabrics or sheet material such as imitation leather, and may be of several thicknesses for greater strength.

I claim:

1. A sunshade for automobile windshields comprising a flat strip of fabric of single ply throughout and of a size at least equal to the area of the shield to be covered, straps attached to one longitudinal edge of the fabric near the ends thereof and adapted to be connected to the other longitudinal edge of the fabric so that the fabric and straps encircle the windshield but without connection to it, so that the fabric may be adjusted to cover different portions of the windshield, substantially as described.

2. A sunshade for automobile windshields comprising a flat strip of fabric of single ply throughout and of a size at least equal to the area of the shield to be covered, straps attached to one longitudinal edge of the fabric near the ends thereof and adapted to be connected to the other longitudinal edge of the fabric so that the fabric and straps encircle the windshield but without connection to it, said fabric having stiffeners in its longitudinal edges, substantially as described.

In testimony whereof I affix my signature.

AUSTIN PEARCE.